(12) United States Patent
Brostmeyer et al.

(10) Patent No.: US 9,353,687 B1
(45) Date of Patent: May 31, 2016

(54) GAS TURBINE ENGINE WITH LIQUID METAL COOLING

(71) Applicants: Joseph D Brostmeyer, Jupiter, FL (US); John W Appleby, Jr., Jupiter, FL (US); Russell B Jones, North Palm Beach, FL (US)

(72) Inventors: Joseph D Brostmeyer, Jupiter, FL (US); John W Appleby, Jr., Jupiter, FL (US); Russell B Jones, North Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 142 days.

(21) Appl. No.: 14/450,944

(22) Filed: Aug. 4, 2014

Related U.S. Application Data

(63) Continuation-in-part of application No. 14/327,655, filed on Jul. 10, 2014, now abandoned, and a continuation of application No. 14/056,992, filed on Oct. 18, 2013, now Pat. No. 8,789,377.

(60) Provisional application No. 61/993,048, filed on May 14, 2014, provisional application No. 61/715,364, filed on Oct. 18, 2012.

(51) Int. Cl.
| | |
|---|---|
| *F02C 1/00* | (2006.01) |
| *F02C 7/16* | (2006.01) |
| *F01D 5/18* | (2006.01) |
| *F01D 25/12* | (2006.01) |
| *F01D 9/06* | (2006.01) |

(52) U.S. Cl.
CPC ... *F02C 7/16* (2013.01); *F01D 5/18* (2013.01); *F01D 9/065* (2013.01); *F01D 25/12* (2013.01); *F05B 2260/205* (2013.01); *F05D 2260/232* (2013.01); *Y02T 50/676* (2013.01)

(58) Field of Classification Search
CPC . F05B 2260/205; Y02T 50/676; F01D 25/12; F01D 9/06; F01D 9/00; F01D 9/02; F01D 9/065
See application file for complete search history.

(56) References Cited

U.S. PATENT DOCUMENTS

| | | | | |
|---|---|---|---|---|
| 3,164,367 A * | 1/1965 | Lynch | .................... | F01D 5/187 415/114 |
| 3,314,649 A * | 4/1967 | Erwin | .................... | F01D 5/181 415/116 |
| 3,527,543 A * | 9/1970 | Howald | .................. | F01D 5/186 415/115 |
| 3,627,444 A * | 12/1971 | Lentz | .................... | B21D 53/78 165/104.26 |
| 3,730,644 A * | 5/1973 | Jubb | ........................ | F02C 7/08 416/241 R |
| 3,738,771 A * | 6/1973 | Delarbre | ................ | F01D 5/181 165/104.25 |

(Continued)

*Primary Examiner* — Gerald L Sung
(74) *Attorney, Agent, or Firm* — John Ryznic

(57) ABSTRACT

A gas turbine engine with a closed-loop liquid metal cooling fluid system for cooling stator vanes within the turbine, in which the stator vanes are made of a metallic material that will not react with the liquid metal cooling fluid. The stator vane may be made from a typical metal material such as ferrous metal alloys, nickel alloys or cobalt (Co) alloys, and an insert or liner made of molybdenum or tantalum may be placed inside to protect the outer vane material from reacting with a liquid metal such as bismuth, lead (Pb), indium, or alloy mixtures of thereof. In the case where the liquid coolant is bismuth, the liquid bismuth must be purged from the cooling system before the fluid cools and solidifies so the solidified bismuth does not expand and break the vanes.

13 Claims, 13 Drawing Sheets

(56) References Cited

U.S. PATENT DOCUMENTS

| | | | | |
|---|---|---|---|---|
| 4,136,516 A * | 1/1979 | Corsmeier | ............. | F01D 5/185 415/114 |
| 4,190,398 A * | 2/1980 | Corsmeier | ............... | F01D 5/18 415/114 |
| 5,774,514 A * | 6/1998 | Rubbia | ................... | G21C 1/00 376/171 |
| 6,163,959 A * | 12/2000 | Arraitz | ................... | F01D 9/065 29/889.1 |
| 6,295,803 B1 * | 10/2001 | Bancalari | ................. | F01D 5/18 415/114 |
| 6,672,075 B1 * | 1/2004 | Sandu | .................... | F01D 5/088 415/114 |
| 8,789,377 B1 * | 7/2014 | Brostmeyer | ............. | F02C 7/16 60/728 |
| 8,870,524 B1 * | 10/2014 | Liang | ..................... | F01D 9/065 415/115 |
| 2007/0071607 A1 * | 3/2007 | Esser | ................... | C22C 19/057 416/241 R |
| 2010/0304161 A1 * | 12/2010 | Huang | ................ | B22D 27/045 428/469 |

* cited by examiner

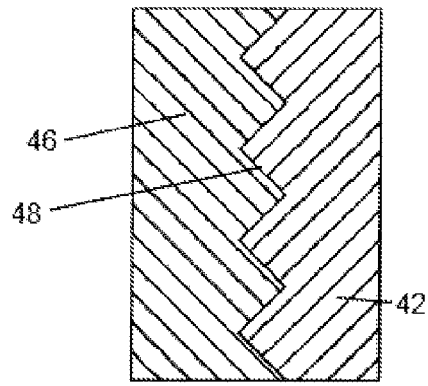
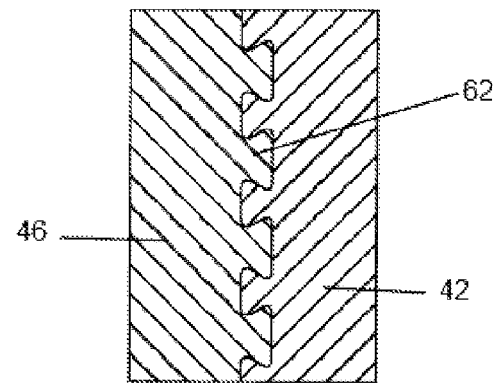
FIG. 11　　　　　　　　FIG. 12
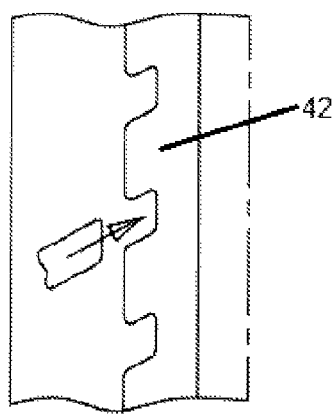
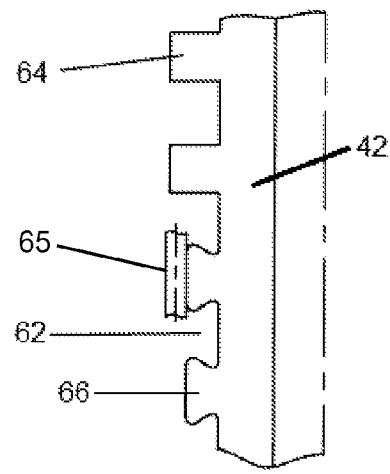
FIG. 13　　　　　　　　FIG. 14

GAS TURBINE ENGINE WITH LIQUID METAL COOLING

CROSS-REFERENCE TO RELATED APPLICATIONS

This application is a CONTINUATION-IN-PART of U.S. patent application Ser. No. 14/327,655 filed on Jul. 10, 2014 and entitled INDUSTRIAL GAS TURBINE ENGINE WITH FIRST STAGE TURBINE VANES HAVING LIQUID METAL COOLING; which is a CONTINUATION of U.S. patent application Ser. No. 14/056,992 filed on Oct. 18, 2013 and entitled GAS TURBINE ENGINE WITH LIQUID METAL COOLING, filed Oct. 18, 2013, now U.S. Pat. No. 8,789,377 issued on Jul. 29, 2014; and which claims the benefit to U.S. Provisional Patent Applications 61/715,364 filed on Oct. 18, 2012 entitled GAS TURBINE ENGINE WITH LIQUID METAL COOLING SYSTEM, and 61/993,048 filed on May 14, 2014 entitled LIQUID METAL COOLING SYSTEM; and the entirety of all of which is incorporated herein by reference.

GOVERNMENT LICENSE RIGHTS

None.

BACKGROUND OF THE INVENTION

Field of the Invention

The present invention relates generally to a gas turbine engine, and more specifically to an industrial sized gas turbine engine with a liquid metal cooling circuit for the first stage turbine vanes.

Description of the Related Art including information disclosed under 37 CFR 1.97 and 1.98.

Gas turbine engines generally include a compressor to compress air that is passed into a combustor and burned with a fuel to produce a hot gas flow. This hot gas flow is then passed through a turbine that typically includes three of four stages of stator vanes and rotor blades to extract energy from the hot gas flow to drive the compressor and, in the case of an industrial gas turbine (IGT) engine, an electric generator.

The efficiency of the engine can be increased by passing a higher temperature gas flow into the turbine. A typical turbine inlet temperature for an engine is 3,000° F., which is high enough to melt the first stage airfoils. In order for the turbine parts to withstand this extreme temperature environment, the airfoils are cooled by passing cooling air through a complex cooling circuit formed within the airfoils. The compressed air passed through the airfoils for cooling is bled off from the compressor. Around 20% of the compressor outlet is used for cooling of various turbine airfoils. However, since the cooling air does not perform any work in the engine, this is lost energy.

It is known to bleed a portion of the compressed air produced in the compressor section of a gas turbine engine for use as a cooling medium in the turbine portion of the engine. The compressed air may be injected into the flow of combustion gas to provide an insulating film over the turbine surfaces, or it may be passed through internal cooling passages formed in the hot turbine parts in a closed cooling system. One example of such a prior art device is illustrated in U.S. Pat. No. 5,782,076 issued to Huber et al. on Jul. 21, 1998, incorporated herein by reference.

A closed-loop cooling system is used to improve the cooling effectiveness of the engine so that compressed air from the compressor is not required. U.S. Pat. No. 6,295,803 issued to Bancalari on Oct. 2, 2001 (incorporated herein by reference) discloses a gas turbine engine having a closed-loop cooling circuit for transferring heat from the hot turbine section to the compressed air produced by the compressor section. The closed-loop cooling system includes a heat exchanger disposed in the flow path of the compressed air between the outlet of the compressor section and the inlet of the combustor. A cooling fluid may be driven by a pump located outside of the engine casing or a pump mounted on the rotor shaft. The cooling circuit may include an orifice for causing the cooling fluid to change from a liquid state to a gaseous state, thereby increasing the heat transfer capacity of the cooling circuit. The Bancalari patent discloses that the cooling fluid can be steam, air, glycol, liquid metals, or other cooling medium.

The Applicants of the present invention have discovered that liquid metals are well suited as cooling fluids for this type of closed-loop turbine cooling system; however, most liquid metals react very strongly with the metallic materials being used in the turbine such as the metals that compose the vanes and blades. For example, modern engines typically include turbine rotor blades and stator vanes made from iron-, nickel-, columbium-, and/or cobalt-based alloys. Bismuth, a good liquid metal for heat transfer processes, will quickly react with nickel- or cobalt-based alloys such that both materials are destroyed within minutes. What is therefore needed is a combination of materials for the turbine and the liquid metal that will not react with one another.

BRIEF SUMMARY OF THE INVENTION

The present invention advantageously provides a closed loop cooling circuit for a gas turbine engine, wherein turbine airfoils and parts of the cooling circuit are composed of a material that does not react with a liquid metal cooling fluid. One such combination may be molybdenum (Mo), molybdenum alloys, or Tantalum (Ta), or Tantalum alloys used as the airfoil metal, with the liquid metal cooling fluid being bismuth, lead, or a combination thereof, including a combination of bismuth and/or lead with indium (In). The liquid metal cooling fluid may be passed through a part of the engine that is exposed to the high temperature gas flow, such as stator vanes or combustor panels, to provide cooling for these parts. For example, the turbine stator vanes may be composed of a nickel-based super-alloy, and may include a cooling passage therein that is lined with or defined by an insert or liner on the inner surfaces of the cooling passage that is made from tantalum (Ta) and/or molybdenum (Mo), and wherein a liquid metal cooling fluid of bismuth (Bi) may be used to cool the stator vanes. The stator vanes can be formed from a standard nickel- (Ni—) based alloy or from molybdenum or another metal. Liquid bismuth has limited reactivity with tantalum or molybdenum at the very high temperatures that a cooling fluid would be exposed to in a turbine of a gas turbine engine. For example, molybdenum-lined channels may separate the liquid metal from the nickel-based alloy. That is, the lined channels may segregate the corrosive fluid flow and prevent it from attacking the metallic materials of the vanes.

In another embodiment of the present invention, a turbine stator vane may be made from a typical metal material such as ferrous metal alloys, nickel alloys or cobalt (Co) alloys, and an insert or liner made of molybdenum or tantalum may be placed inside to protect the outer vane material from reacting with a liquid metal such as bismuth, lead (Pb), indium, or alloy mixtures of thereof. The insert or liner may separate the liquid metal from the main vane material and allows for heat to be conducted from the main vane material to the liquid metal coolant flowing through the insert. Other coatings for the vane material may include an oxide coating, or a thin coating of glass, silicon carbide or silicon nitride.

A liquid metal transport tube may be connected to an opening formed on the vane to carry the liquid metal coolant into and out of the vane. The connection may include a compressive conical fitting surface with a molybdenum seat to the molybdenum coating or layer formed on the tube and the vane so as to prevent molybdenum exposure to oxygen in the air. The fitting may include a compliant platinum (Pt) disk seal to allow for thermal expansion between the fitting and the vane opening so that an airtight, secure fit is maintained to prevent oxygen contamination of the molybdenum.

The vane may be formed by casting a nickel-based alloy around a preformed molybdenum liquid metal cooling channel. Fittings, such as conical fittings, may then be formed on the openings of the liquid metal passages within the vanes for connection to external liquid metal pipes or tubes. In another embodiment, the vane may be formed by casting a nickel-based alloy, and then forming threaded passages therein for the insertion of nickel-encapsulated molybdenum tubes to transport the liquid metal.

In another embodiment, a stator vane may be formed from a nickel-based alloy cast around a molybdenum cooling channel liner for transporting the liquid metal, wherein the vane includes liquid metal cooling channels and cooling air cooling channels in the thin trailing edge section of the vane with trailing edge cooling air discharge holes so that cooling air may be used to cool the thin sections and then discharged from the vane. A thin layer of sodium positioned between the airfoil and the liquid metal coolant channel that maintains a heat transfer medium even when thermal expansion of the airfoil with respect to the liquid metal coolant channel changes the spacing.

BRIEF DESCRIPTION OF THE SEVERAL VIEWS OF THE DRAWINGS

FIG. 11 shows a cross-sectional view of a first embodiment of an interface between two metals used in a cooling tube.

FIG. 12 shows a cross-sectional view of a second third embodiment of an interface between two metals used in a cooling tube.

FIG. 13 shows a representation of a first embodiment of a process for forming projections from one of the materials used in a liquid metal cooling.

FIG. 14 shows a representation of a second embodiment of a process for forming projections from one of the materials used in a liquid metal cooling tube.

DETAILED DESCRIPTION OF THE INVENTION

Figure 1:
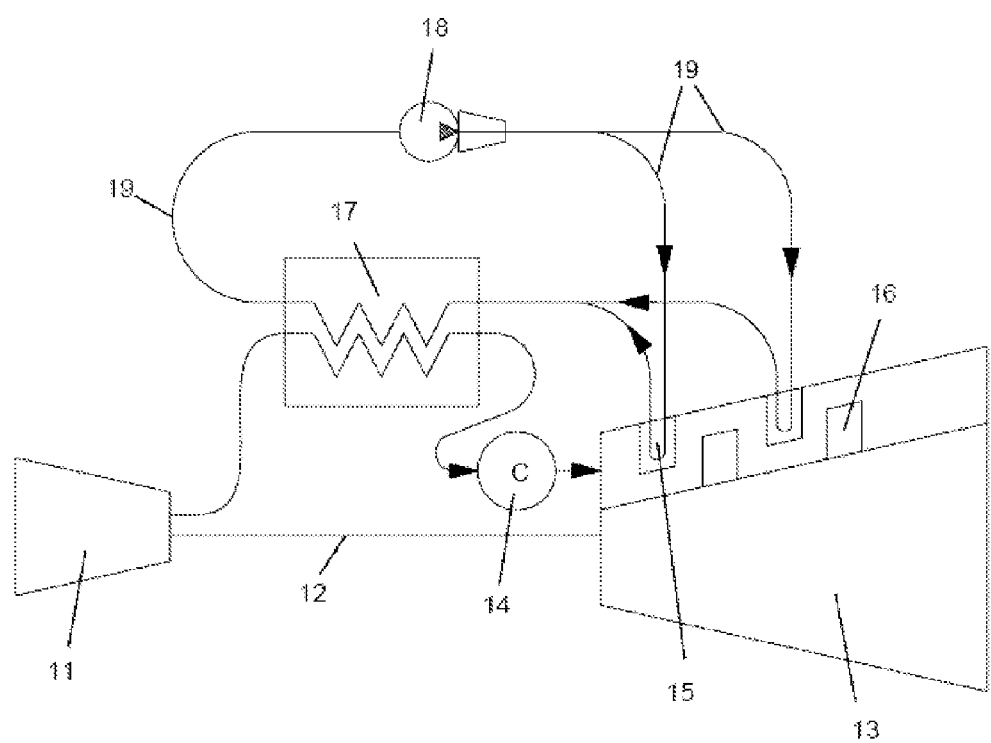
FIG. 1 shows a schematic view of a first embodiment of a closed-loop cooling circuit for a gas turbine engine in accordance with the present invention.
Figure 2:
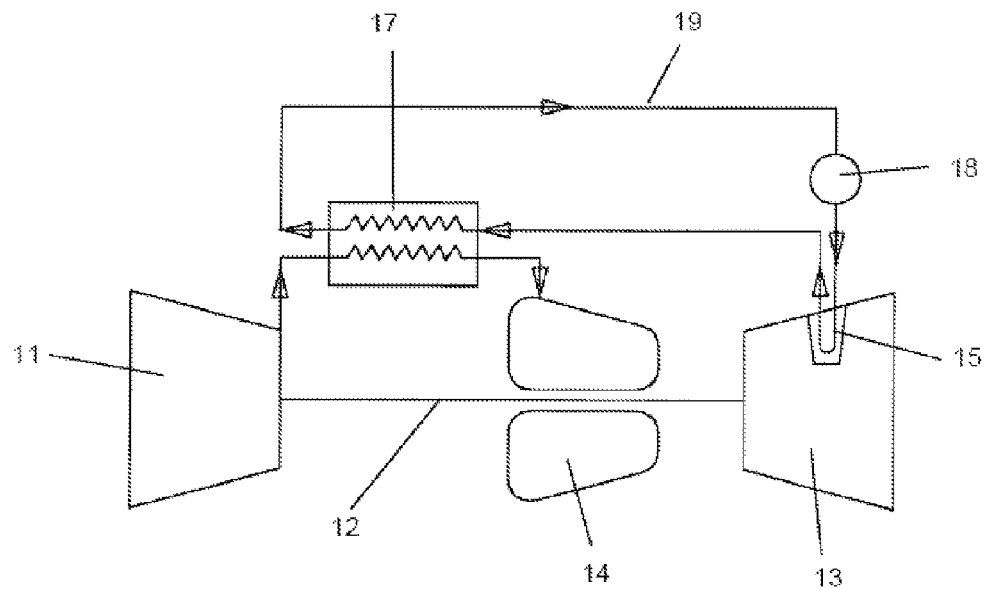
FIG. 2 shows a schematic view of a second embodiment of a closed-loop cooling circuit for a gas turbine engine in accordance with the present invention.

The present invention is an industrial gas turbine engine in which a liquid metal coolant is used to provide cooling for the turbine airfoils such as the first stage stator vanes. A large frame industrial sized gas turbine engine is used to produce electrical power in which weight is not a design issue such as in an aero engine used to propel an aircraft. a liquid metal cooling circuit is relatively heavy and thus may not be feasible in an aero engine. The first stage stator vanes are exposed to the highest gas stream temperatures and thus require the most cooling. Second stage stator vanes can also make use of the liquid metal cooling systems. However, rotor blades rotate and thus would be difficult to cool using a liquid metal coolant due to sealing issues and centrifugal loads. Referring now to FIGS. 1 and 2, cross-sectional views of a closed-loop cooling system for a gas turbine engine are shown. The closed-loop system may include a compressor 11 rotatably connected by a rotor shaft 12 to a turbine 13, a combustor 14 positioned between the compressor 11 and a turbine 13, two stages of stator vanes 15 and rotor blades 16, a heat exchanger 17, a cooling fluid pump 18, and cooling fluid lines 19 that form a closed-loop cooling fluid passage with the cooled stator vanes 15.

The heat exchanger 17 may be located inside the engine core as in the Bancalari patent or may be located outside as shown, for example, in FIG. 1. The heat exchanger 17 may transfer heat from the stator vanes 15 into the compressed air entering the combustor 14. The compressed air discharged from the compressor 11 may be passed through the heat exchanger 17 and then into the combustor 14. The closed-loop cooling circuit may include a fluid flow path from the pump 18 and into the cooling circuit of one or more stages of stator vanes 15, through the heat exchanger 17, and then back into the pump 18. The system shown in FIG. 1 may be generally the same as the system shown in FIG. 2, but additional stator vanes 15 and rotor blades 16 are shown in FIG. 1 for illustration.

The stator vanes 15 having internal cooling passages may be composed of a material that will not react with the liquid metal cooling fluid. In one embodiment, the stator vanes 15 may be made from ferrous alloys, nickel alloys, and/or cobalt alloys. Accordingly, the liquid metal cooling fluid may be bismuth, or lead, or a combination of bismuth and lead, or a combination of bismuth and/or lead and indium, and the liner or tubing may be formed from molybdenum or tantalum in order to avoid a reaction between the liquid metal cooling fluid and the vane material. Bismuth (like water) expands when passing from a liquid to a solid, and thus the use of lead or indium is mainly used to counteract this expansion on solidification. With a proper amount of lead and/or indium, the liquid bismuth combination will not expand when solidified within the cooling passages. The stator vane 15 with the internal cooling fluid passage may be considered to be a heat exchanger. The heat exchanger, for example, either the heat exchanger 17 shown in FIGS. 1-3 or the stator vane 15 with the internal cooling fluid passage, is exposed to the highest temperature in the liquid cooling circuit. For example, the external hot gas temperature may be approximately 2,500° F. whereas the stator vane 15 has a metal temperature of approximately 1,500° F. and the liquid metal cooling fluid has a temperature of approximately 1,000° F.

Molybdenum may be used with bismuth as the cooling fluid if the cooling fluid can be purged from the cooling system prior to engine shutdown or prior to the cooling of the engine parts. As liquid bismuth cools down, it expands upon solidification, which may cause the hollow parts in which the liquid metal flows to crack or break. Laboratory tests have confirmed that liquid bismuth has limited reactivity with molybdenum and its alloys, especially at elevated temperatures consistent with gas turbine engine operation. Liquid bismuth would be well-suited for use as a liquid metal cooling fluid, but it reacts harshly with modern materials used in airfoils of gas turbine engines which are typically nickel, cobalt, or iron based. Molybdenum is a high temperature resistant material in the absence of oxygen, but is not used in airfoils because this material cannot be cast or machined into an airfoil shape because of its high melting temperature.

In an embodiment in which bismuth is used as the liquid metal cooling fluid, the turbine stator vane 15 may be made from a standard nickel-based alloy or super-alloy, but with the cooling fluid passage being lined or coated with tantalum and/or molybdenum or with an insert made of tantalum and/or molybdenum. The liquid metal bismuth does not react with the tantalum and/or molybdenum, and provides adequate cooling for the vane 15. The improved cooling capability of the liquid bismuth may provide sufficient extra cooling so that the standard nickel-based alloys or super-alloys could still be used, even with the higher gas stream temperature.

As the hot gas flow from the combustor 14 enters the turbine and passes around the stator vanes 15, the liquid metal cooling fluid may be pumped through the closed-loop cooling circuit to transfer heat away from the vanes 15 and into the cooling fluid. The heated cooling fluid may then be passed through the heat exchanger 17 to add additional heat to the compressed air entering the combustor 14. Because of this system, compressed air from the compressor 11 may not be required for cooling of the first stage stator vanes or the second stage stator vanes if these are also cooled by the liquid metal cooling fluid. The first stage rotor blades 16 may still be cooled using compressed air from the compressor 11 as is done in the prior art. The temperature of the compressed air discharged from the compressor 11 is typically at around 1,100° F., which is high for a cooling fluid, especially for the first stage vanes. Thus, with the cooling circuit of the present invention, compressed air from the compressor 11 used for cooling is not required and, therefore, the system efficiency loss from using bleed-off compressed air from the compressor is not wasted (that is, system efficiency is increased). The liquid metal coolant fluid lines 19 may be made from or lined with molybdenum or tantalum in order to provide a non-reactive surface for the liquid metal coolant such as bismuth.

Figure 3:
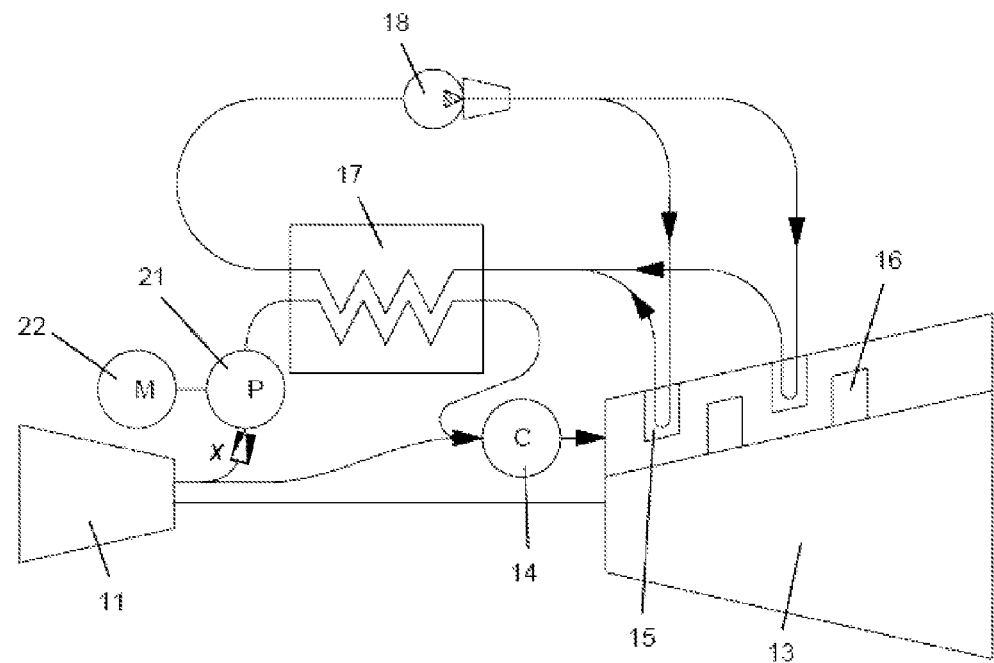
FIG. 3 shows a schematic view of a third embodiment of a closed-loop cooling circuit for a gas turbine engine in accordance with the present invention.

Referring now to FIG. 3, a schematic view of a third embodiment of a closed-loop cooling circuit for a gas turbine engine is shown. The closed-loop liquid metal cooling circuit may include a configuration wherein a portion of the compressor outlet air is passed through the heat exchanger 17 prior to entering the combustor 14. As shown in FIGS. 1 and 2, all of the compressor outlet air may be passed through the heat exchanger 17 which may produce approximately a 4% pressure loss (delta P loss) due to the heat exchanger pressure drop. In the embodiment of FIG. 3, a portion of the compressor 11 outlet air may pass straight into the combustor 14, whereas the remaining compressor outlet air may pass through the heat exchanger 17 to pick up the heat from the liquid metal fluid passing through the heat exchanger 17. The heated compressor outlet air may then be passed into the combustor 14 to be merged with the unheated compressor outlet air and burned within the combustor 14. The amount of compressor outlet air passing through the heat exchanger 17 (represented as "x" in FIG. 2) may be between approximately 15% and approximately 30%. A compressor 21 driven by a motor 22 may increase the pressure of the compressor 11 outlet air that flows into the heat exchanger 17 by approximately 5% delta P in order to reduce the compressor work for most of the compressor 11 discharge.

The systems shown in FIGS. 1-3 may be used to cool a stator vane 15 (first, or first and second stage vanes) within the turbine 13 of the engine. However, other parts of the engine that are exposed to the high temperature gas flow may also be cooled using a closed-loop liquid metal cooling circuit of the present invention, wherein the heat exchanger 17 may be made of a material that will not react with the liquid metal cooling fluid. For example, the combustor 14 may include a nickel-based or cobalt-based liner exposed to the hot gas flow, which liner may include an internal heat exchanger passage made of a material such as molybdenum that has a liquid metal fluid cooling passage, through which a liquid metal (such as bismuth or lead, or combinations of bismuth and lead and, optionally, indium) may be passed to provide cooling for the combustor panel. The cooling fluid lines 19 connected to the heat exchanger 17 may be made of the same high-temperature-resistant material, such as molybdenum or tantalum, if the liquid metal coolant temperature is high enough to warrant the use of the same material. The heat exchanger 17 may be exposed to a high temperature and may therefore be made from a material such as molybdenum or tantalum that will not react with the liquid metal cooling fluid such as bismuth or lead. The liquid metal coolant lines 19 may be formed from or lined with molybdenum or tantalum in order to provide a non-reactive surface for the liquid metal coolant such as bismuth or lead. The temperature of the liquid metal coolant such as bismuth may vary only about 200° F. along the entireties of the liquid metal cooling lines 19 due to the high level of heat transfer capability these liquid metal coolants can provide.

Bismuth may be the best-suited liquid metal cooling fluid for the high temperatures required for use in a gas turbine engine. Tantalum is a refractory metal with a high melting point of 5,425° F. and a high resistance to corrosion. In tests, liquid bismuth showed limited reaction with tantalum at temperatures well over 1,200° F.

If the liquid metal cooling passages within the vane and the pipe or tubes that connect the vane to the heat exchanger are composed of a material such as molybdenum that can withstand high temperatures and that will not react with the liquid metal cooling fluid (such as bismuth), then the molybdenum must be protected from exposure to air because the oxygen content within air will react with, that is, oxidize, the molybdenum. Therefore, the molybdenum may be coated with a material that will not react with oxygen but will be able to withstand the high temperatures for use in the gas turbine engine. For example, the molybdenum liquid metal cooling passage may be covered by nickel plating (for example, of nickel-based super-alloys) or other oxidation-resistant bond coating or casting of steel-, nickel-, or cobalt-based alloys, including stainless steel. Further, cladding or high isostatic pressure (HIP) bonding of the molybdenum may be used. With this structure, the molybdenum passage may transport corrosive fluids at very high temperatures (in relation to a gas turbine engine) without corrosive attack.

Figure 18:
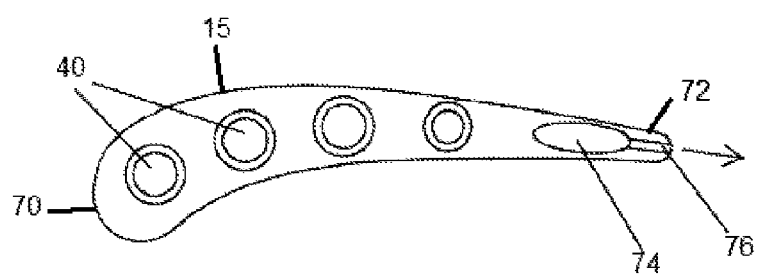
FIG. 18 shows a cross-sectional view along a spanwise direction of a first embodiment of a vane cooling circuit.

A bond formed between the molybdenum and, for example, stainless steel or nickel-based alloy must be a robust connection in order to resist crack formation. This may be achieved using several methods including plating, surface preparation, or cast encapsulation. In FIG. 18, plating of the initial molybdenum component with a bond coating of nickel, aluminide, or MCrAlY or other suitable material may ensure whetting of the case or further plated encapsulation. Further, the external surface of the molybdenum may be treated with a roughening agent to promote a mechanical bond interface.

Figure 4:
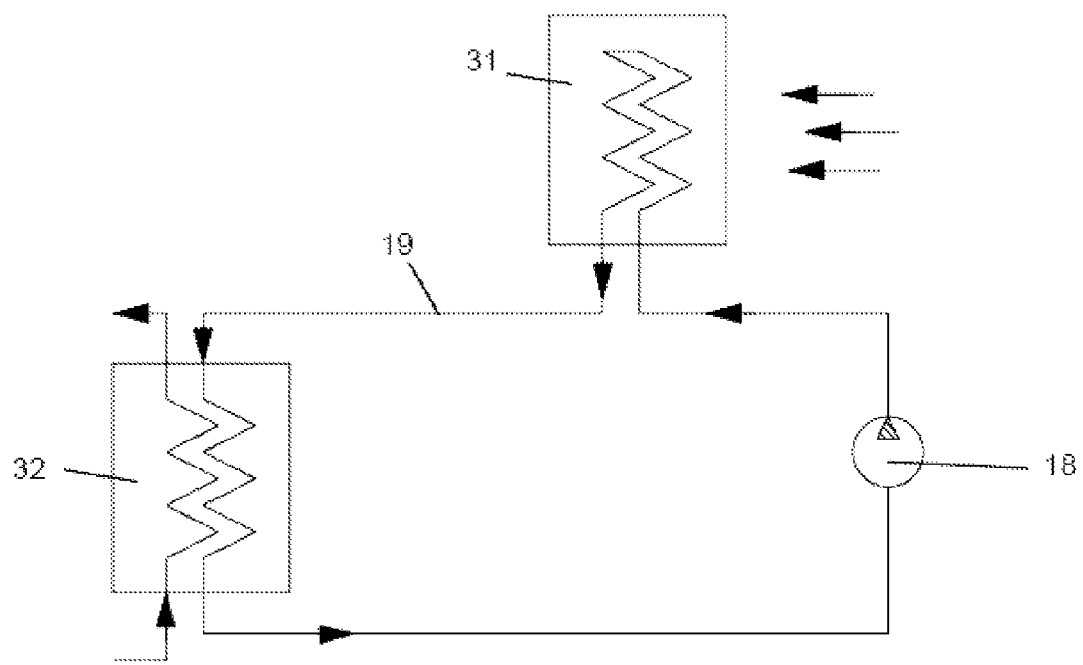
FIG. 4 shows a schematic view of a closed-loop liquid metal cooling circuit used in a heat exchanger exposed to a high temperature fluid flow in accordance with the present invention.

One exemplary system that the heat exchanger having the closed-loop liquid metal cooling circuit of the present invention can be used in is a solar energy concentration receiver, which may be used to produce electrical power from sun rays. In such a system, solar energy light may be reflected from mirrors and concentrated in a small area such that a high temperature can be applied to a fluid. As a non-limiting embodiment, such a system is shown in FIG. 4. The solar concentrator may include a first heat exchanger 31 with a closed-loop cooling fluid circuit within to absorb the heat from the concentrated solar rays and transmit the heat to the liquid metal cooling fluid. The heated liquid metal cooling fluid may then be passed through a second heat exchanger 32 that is used to transfer heat from the liquid metal fluid to air or water to produce a hot gas flow such as heated air or steam from the heated water. This hot gas flow is then passed through a turbine to drive a generator and produce electric energy. In the system shown in FIG. 4, the first heat exchanger 31 may be lined with a material that will not react with the liquid metal cooling fluid, such as molybdenum and/or tantalum, while the liquid metal may be bismuth, lead, or combinations thereof, including combinations with indium. The second heat exchanger 32 may not be exposed to a high temperature like that in the first heat exchanger 31, and therefore may be made from a conventional ferrous material. Further, the second heat exchanger 32 may be used to heat up a second fluid such as water to produce steam or air for use in a steam turbine. A liquid metal cooling fluid pump 18 may also be used in the embodiment shown in FIG. 4 to pump the cooling fluid through the closed-loop system.

Figure 5:
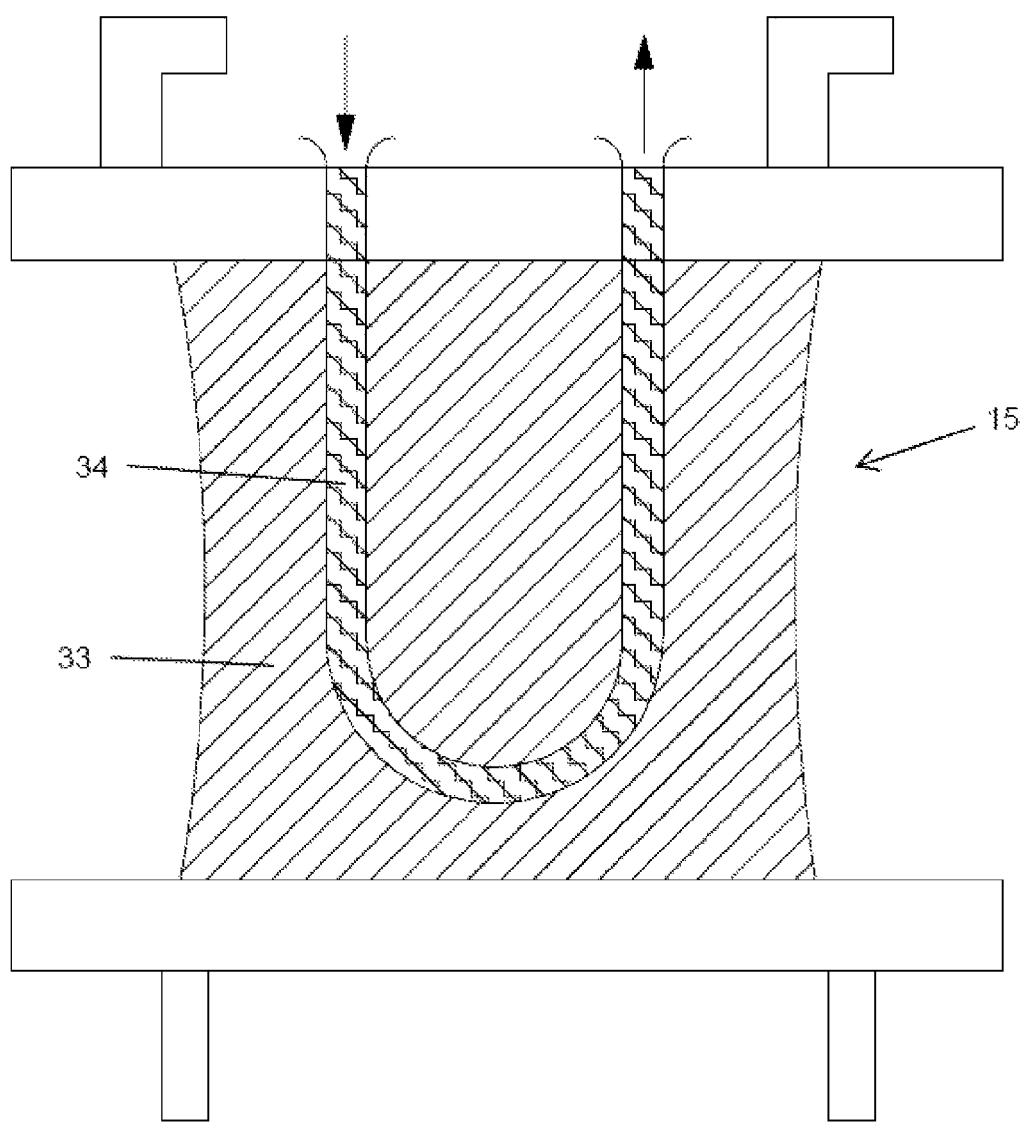
FIG. 5 shows a cross-sectional view of a turbine stator vane with a metal insert secured inside for cooling the vane using a liquid metal.

Referring now to FIG. 5, a stator vane 15 may be made from a typical turbine airfoil material such as ferrous alloys, nickel alloys, or cobalt alloys, but may include an insert or liner 34 within the cooling flow passage that is made from a material that may have limited reactivity with a liquid metal coolant used for cooling of the vane. FIG. 5 shows a stator vane 15 with a main body 33 made from a material such as a nickel alloy with an insert 34 or a coating of a material such as molybdenum or tantalum to protect the main body 33 material from a liquid cooling metal material such as bismuth. The insert 34 may be made from, for example, molybdenum and/or tantalum, and may be secured within the airfoil main body 33 without being bonded to the airfoil, but still allowing heat to be conducted from the vane metal to the liquid metal coolant through the insert 34. For example, the liquid metal coolant can be bismuth or lead, or alloy mixtures thereof, including mixtures with indium. Bismuth is a rare material that expands when it solidifies (similar to water), and adding lead to bismuth in adequate amounts may limit the expansion when the liquid metal coolant alloy solidifies. Use of molybdenum and/or tantalum for the insert may have a limited reactivity with the liquid metal coolant in the temperature range for a cooled turbine stator vane 15. The stator vane 15 with the liquid metal cooling insert 34 may be usable in a non-rotating airfoil, such as the stator vane 15, and not for a rotor blade 16 because of the high centrifugal forces involved, and the difficulty of sealing rotating parts.

Instead of including an insert 34, the passage within the vane 33 may be coated with a material such as tantalum and/or molybdenum. Alternatively, an oxide coating, a silicon carbide coating, a silicon nitride coating, or a thin layer of glass may be used. For example, a configuration including a thin layer of glass may optimize the thermal conductivity, thereby allowing for affective heat transfer to the liquid metal while providing protection to the base metal.

Figure 6:
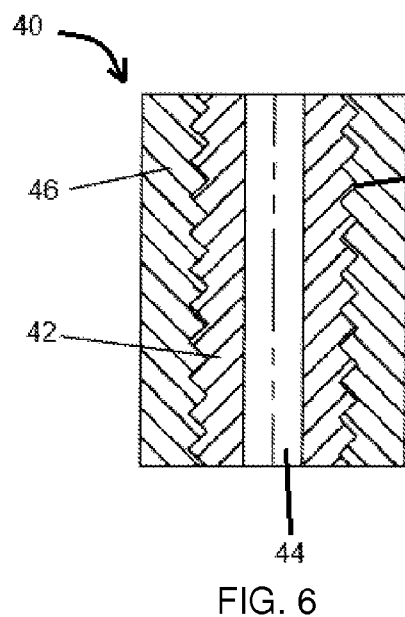
FIG. 6 shows a cross-sectional view of a first embodiment of a liquid metal cooling tube.
Figure 7:
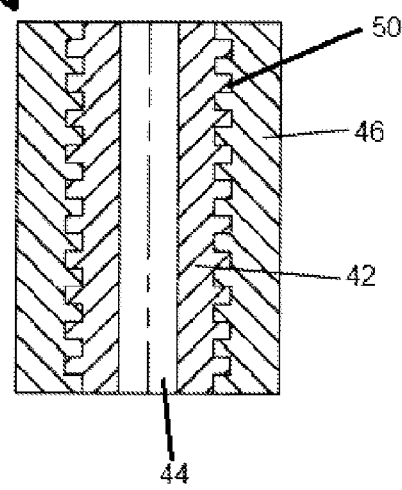
FIG. 7 shows a cross-sectional view of a second embodiment of a liquid metal cooling tube.

Referring now to FIGS. 6 and 7, liquid metal cooling tubes are shown. A connection between bodies for the liquid metal passages may be a compressive conical fitting interface wherein the molybdenum of one piece seats to the molybdenum of the connecting piece, and the encapsulating material (for example, a nickel-based alloy) of the one piece is seated with the same material of the connecting piece. A platinum conical seal may be placed between the two nickel seats so that any roughness of the seats will be compensated for by the relatively softer platinum seal that also has a high temperature resistance. The molybdenum-to-molybdenum seat may seal the liquid, and the platinum seal on the nickel interface may simultaneously create a complaint airtight seal.

Figure 8:
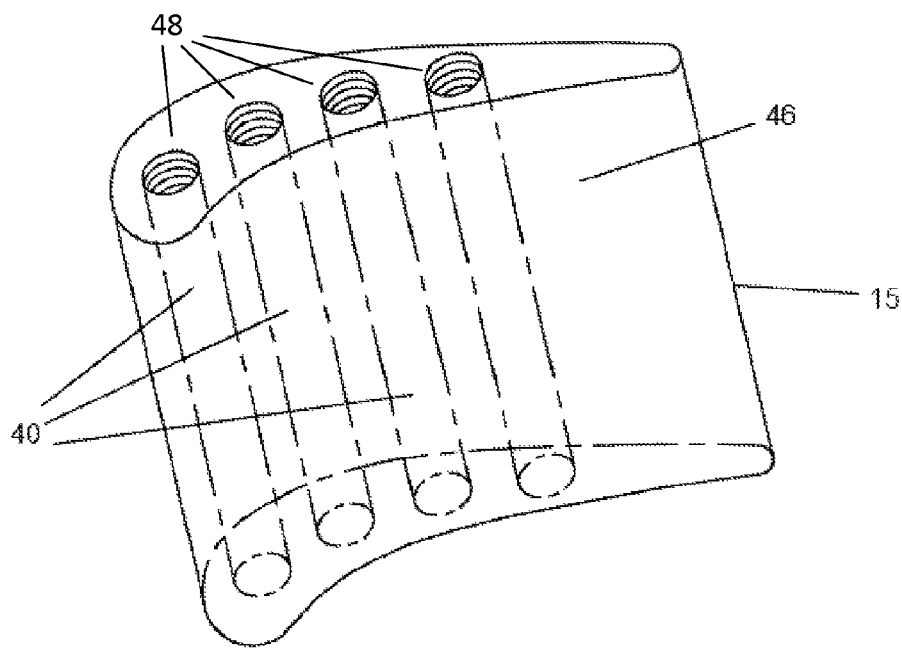
FIG. 8 shows a perspective view of a turbine blade with liquid metal cooling passages.

FIG. 6 shows a liquid metal cooling tube 40 with molybdenum inner section 42 that has a passage 44 through with the liquid metal coolant may flow. The molybdenum inner section 42 may be encapsulated by an oxidation-resistant material, such as a nickel-based alloy, that is being used as the material for turbine stator vanes 15 and rotor blades 16. The interface between the molybdenum piece 42 and the nickel-based alloy piece 46 may be a threaded connection. For example, a vane 15 may be formed with a number of passages 44, each passage 44 having threaded holes 48 formed on the surface so that individual molybdenum pieces 42 can be screwed into place within the vane 15. FIG. 8 shows the vane 15 with four threaded passages 48 in which four separate molybdenum pieces 42 may be secured within. However, the interface may be formed without threading if another joining process, such as brazing, is strong enough to hold the two pieces together. The nickel-based alloy piece 46 may form the vane structure.

FIG. 7 shows another embodiment in which the molybdenum piece 42 may include outwardly extending projections 50 that form cooling fins to transfer heat from the nickel-based alloy piece 46 to the interior of the molybdenum piece 42. In the embodiment shown in FIG. 7, the nickel-based alloy piece 46 may be cast over the molybdenum piece 42.

Figure 9:
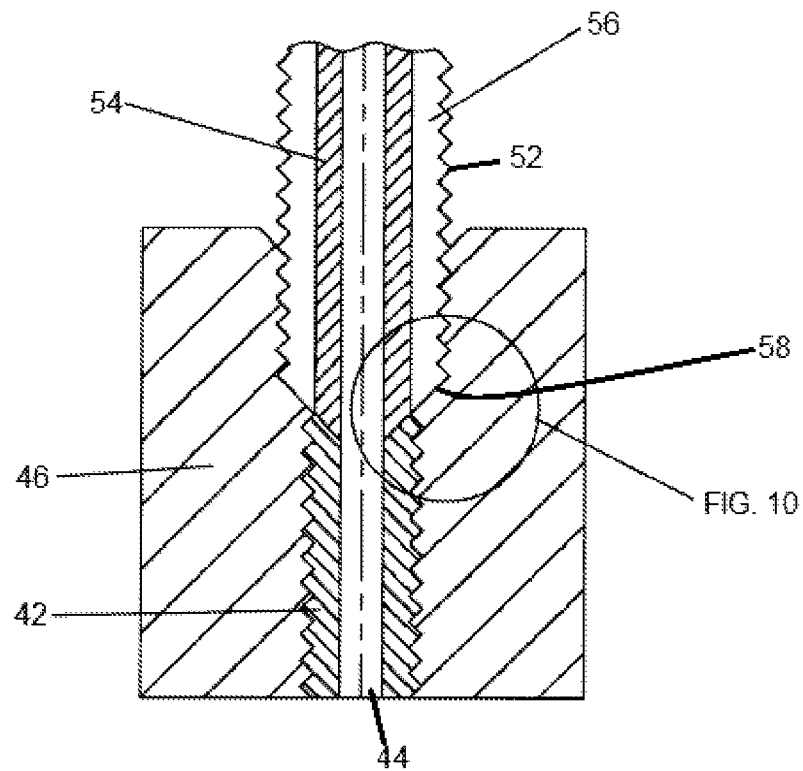
FIG. 9 shows a cross-sectional view of a liquid metal cooling tube connection design.
Figure 10:
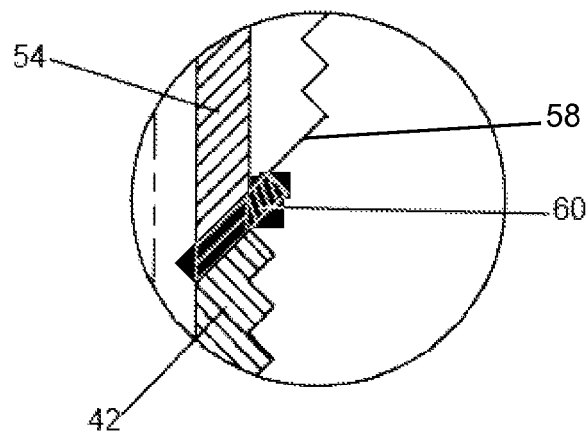
FIG. 10 shows a close-up view of a section of the tube shown in FIG. 9.

Referring now to FIGS. 9 and 10, a cross-sectional view of a liquid metal cooling tube connection is shown. Specifically, FIG. 9 shows a connection between a vane 15 and an external pipe or tube 52 that channels the liquid metal into and out of the vane 15. The molybdenum piece 42 may be encapsulated by the nickel-based alloy piece 46 to form a liquid metal cooling passage 44 within the vane 15. The external pipe or tube 52 may also be formed with a molybdenum inner piece 54 encapsulated by a nickel-based alloy outer piece 56. A threaded opening may be formed with a conical seat 58 on the bottom, as shown in the circled area in FIG. 9 and corresponding close-up view in FIG. 10. This may allow for the external pipe or tube 52 to be seated in a secure manner to the vane liquid metal passage 44. The molybdenum 42, 54 in both pieces may be seated against each other so that a closed path composed of molybdenum is formed for the flow of liquid metal therethrough. That is, once the external pipe 52 is seated against the vane cooling tube 40, the passage 44 of the vane cooling tube 40 may extend into the external pipe 52 so that the liquid metal may flow easily from the vane 15 to the external pipe 52. For example, the external pipe or tube 52 may be threaded into the threaded opening of the vane 15. FIG. 10 shows a platinum conical seal 60 that may be used between the nickel-nickel interface of the conical seats 58 of the external pipe 52 and the molybdenum 42 of the vane cooling tube 40 to prevent any space from forming between the nickel components through which air (containing oxygen) could react with the molybdenum. Platinum has a very high melting temperature and is soft enough to be compressed between the two seats 58 and expand when any movement occurs between the two seats that could allow air to pass into the interface.

Referring now to FIGS. 11-14, interfaces between two metals in a cooling tube and methods for forming the interface are shown. The molybdenum layer 42 may be secured to the nickel-based alloy underlay 46 through a number of processes. For example, FIG. 11 shows a process in which the molybdenum piece 42 may be threaded into the nickel-based alloy piece 46 because of screw thread interface 48 formed onto both pieces. In this embodiment, the nickel-based alloy piece 46 may be cast prior to securing the molybdenum piece 42 to it. FIG. 12 shows a number of dovetail grooves 62 formed on the outer surface of the molybdenum piece 42 with the nickel-based alloy piece 46 being cast over the molybdenum piece 42.

The grooves formed on the molybdenum piece 42 may be machined into the surface by cutting angled grooves, as shown in FIG. 13. FIG. 14 shows another process in which the grooves may be formed by cutting (as with an EDM process) to form straight grooves with a flat top and flat sides to form steps 64. Then, a device such as a roller 65 may be used to flatten the flat tops of the steps 64 so that a shorter but wider projection 66 is formed with dovetail-shaped grooves 62 between the flattened projections 66. The dovetail-shaped grooves 62 may provide a stronger binding structure to retain the nickel-based alloy over the molybdenum surface.

Figure 15:
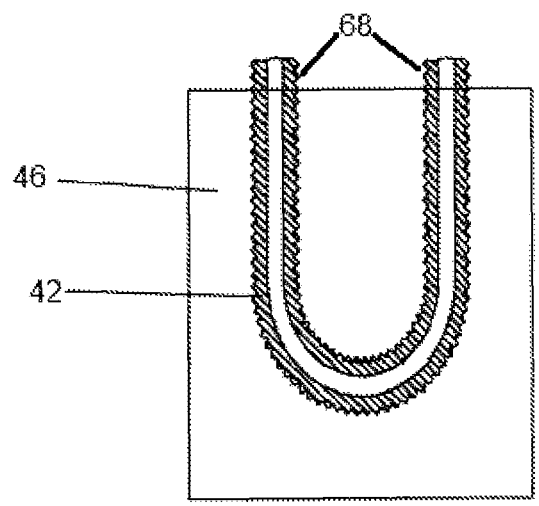
FIG. 15 shows a cross-sectional view of a vane with a liquid metal cooling tube cast within a vane material.
Figure 16:
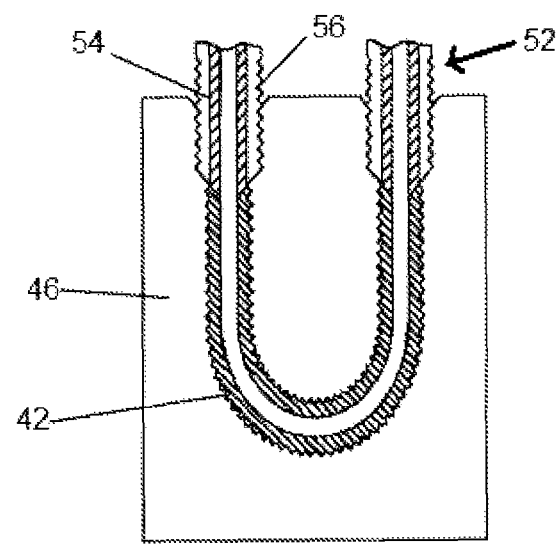
FIG. 16 shows a cross-sectional view of a vane with a liquid metal cooling tube, the cooling tube having external tube connections.

Referring now to FIGS. 15 and 16, cross-sectional views of liquid metal cooling tubes cast within a vane material are shown. The stator vane 15 with the liquid metal cooling channels may be formed by casting the nickel-based alloy vane structure 46 over the molybdenum liquid metal cooling pipe or tube 42. FIG. 15 shows one molybdenum liquid metal cooling tube 42 having a U-shape with teeth or other ridges being formed on the outer surface to form a bonding surface for the cast nickel-based alloy 46. A wax pattern may be formed over the molybdenum tube 42 to represent the shape of the vane 15 for use in an investment casting process. The wax pattern may then be used to investment cast the nickel-based alloy 46 around the molybdenum tube 42 to form the vane 15. The ends 68 of the molybdenum tube 42 may then be cut off to form wider openings for threads that form a threaded attachment end for securing the external molybdenum tubes 52 to the vane 15 as shown in FIGS. 9 and 16. The external tubes 52 may include the nickel-based alloy piece 56 cast over the molybdenum inner piece 54. The external tubes 52 may carry the liquid metal coolant through the closed liquid metal path through the cooling circuit and the heat exchanger 17. The interface of the molybdenum seat may be similar to that shown and described in FIGS. 9 and 10 and may include the platinum conical seal to prevent oxygen from reacting with the molybdenum.

Figure 17:
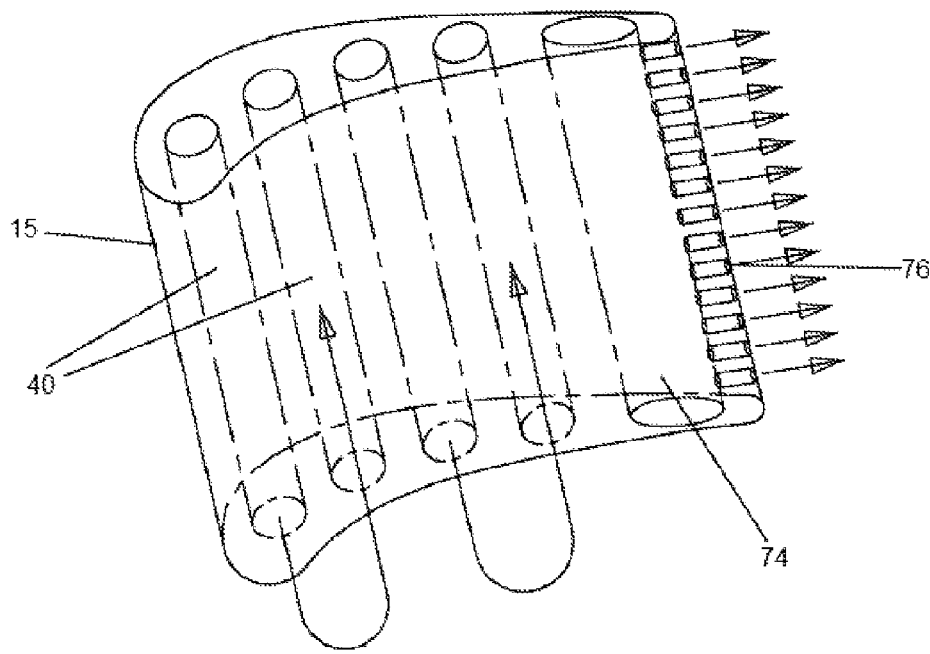
FIG. 17 shows a perspective view of a vane with a liquid metal cooling circuit and a compressed air cooling circuit.
Figure 19:
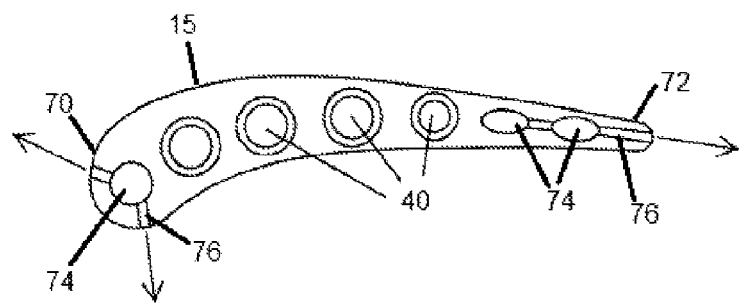
FIG. 19 shows a cross-sectional view along a spanwise direction of a second embodiment of a vane cooling circuit.

Referring now to FIGS. 17-19, vanes with a liquid metal cooling circuit and compressed air cooling circuit are shown. FIG. 17 shows a stator vane 15 with a first cooling circuit for a liquid metal coolant and a second cooling circuit for a second cooling fluid, such as air. The first and second cooling circuits may be separated. The vane 15 may include liquid metal cooling passages 40 as described above for passing a liquid metal coolant to cool the vane 15 in which the passages may be formed with molybdenum encapsulated by a nickel-based alloy that forms the vane structure 15. The liquid metal cooling passages 40 may be formed within the airfoil that has enough thickness or width to accommodate the passages 40. FIG. 18 shows a cross-sectional view of the airfoil of the vane 15 with four liquid metal cooling passages 40, the cooling passages 40 being spaced apart between a leading edge region 70 of the vane 15 toward a narrowing trailing edge region 72 of the vane 15. The first cooling circuit may comprise the liquid metal cooling passages 40, whereas the second cooling circuit may comprise a cooling air supply channel 74 and a plurality of exit holes 76. The cooling air supply channel 74 may extend along the trailing edge region 72 to supply cooling air to a row of exit holes 76 that open on the trailing edge 72 to discharge cooling air from the airfoil and cool the trailing edge region 72. The cooling air circuit may be used in the section of the airfoil that is too narrow to fit the larger liquid metal cooling passages 40. FIG. 19 shows an airfoil in which a cooling air circuit is also used in the leading edge region 70. A second cooling air supply channel 74 may be used to supply cooling air to a showerhead-type arrangement of film cooling holes 76 spaced along the leading edge region 70 to discharge a layer of film cooling air and cool the leading edge 70 of the vane 15.

Figure 20:
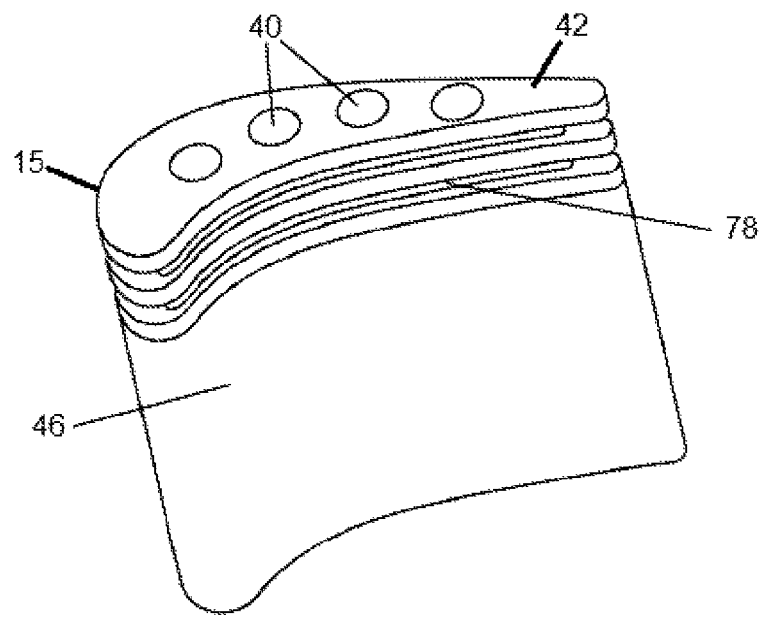
FIG. 20 shows a perspective view of a liquid metal cooling piece used to form a cooled vane.
Figure 21:
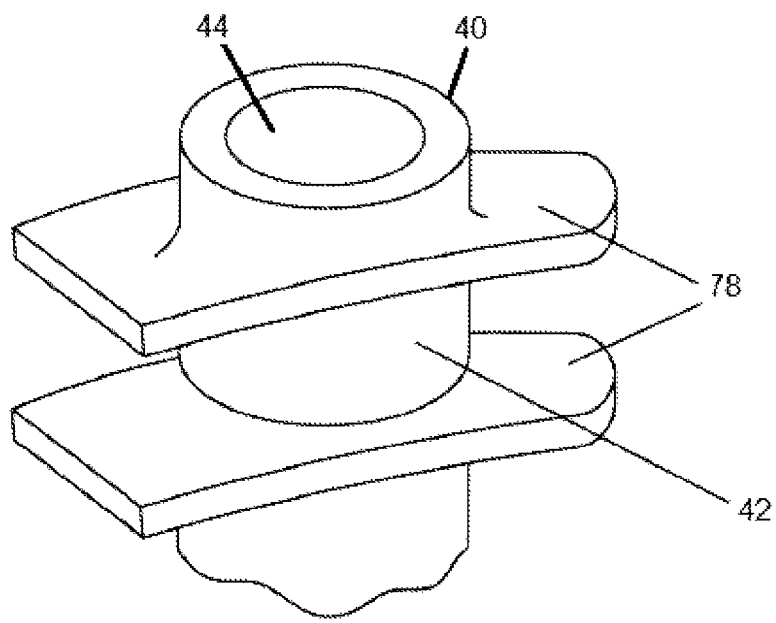
FIG. 21 shows an individual liquid metal cooling passage piece that may be used to form a cooled vane.

Referring now to FIGS. 20 and 21, liquid metal cooling passage pieces are shown. FIG. 20 shows one embodiment in which the vane 15 may be formed from the molybdenum liquid metal cooling channels 42 with the nickel-based alloy 46 cast around them. For example, the molybdenum piece 42 may include four liquid metal cooling passages 40 on the inside and a series of ridges or cooling fins 78 extending out from the outer surface along the airfoil in a chord wise direction. The fins 78 may enhance the heat transfer rate from the nickel-based alloy 46 cast around the fins 78 to the liquid metal coolant passing through the cooling passages 44. In the embodiment shown in FIG. 20, the molybdenum pieces 42 of the cooling tubes 40 may be formed together as a single piece.

FIG. 21 shows another process of forming the vane 15 in which each liquid metal cooling passage 40 may be formed from a separate molybdenum piece 42 that has the fins 78 extending outward. Each piece 42 may be stacked together in a mold to form the complete molybdenum piece shown in FIG. 20. Nickel-based alloy 46 may be cast around the multiple molybdenum pieces 42 to form the composite vane 15 with the molybdenum cooling passages 44 formed within the nickel-based alloy airfoil 15. The wider openings with the screw threads may then be formed so that the external liquid metal cooling tubes 52 can be secured to the vane passages 44.

Figure 22:
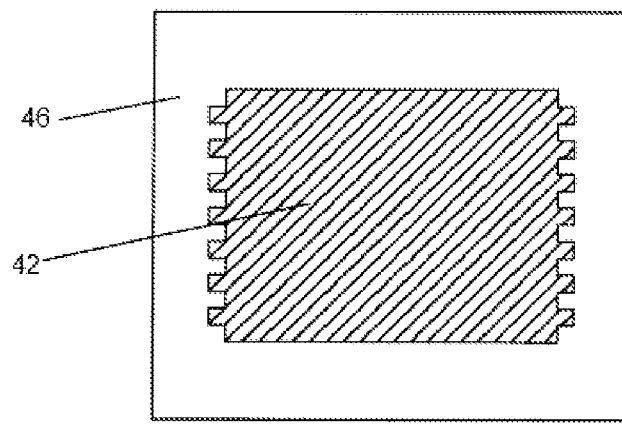
FIG. 22 shows a first step in a process of forming a vane having liquid metal cooling passages therein.
Figure 23:
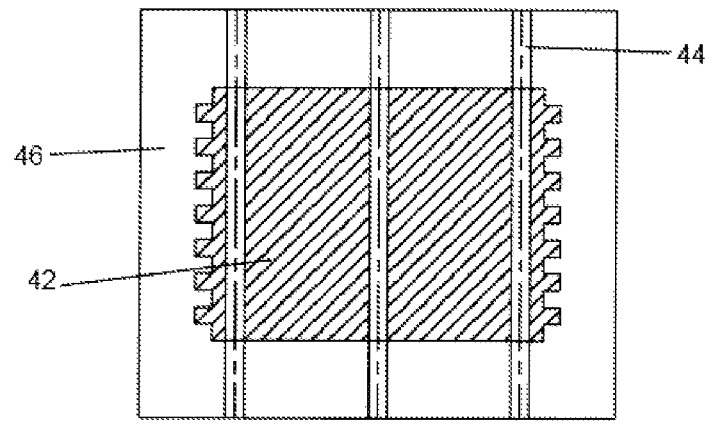
FIG. 23 shows a second step in a process of forming a vane having liquid metal cooling passages therein.
Figure 24:
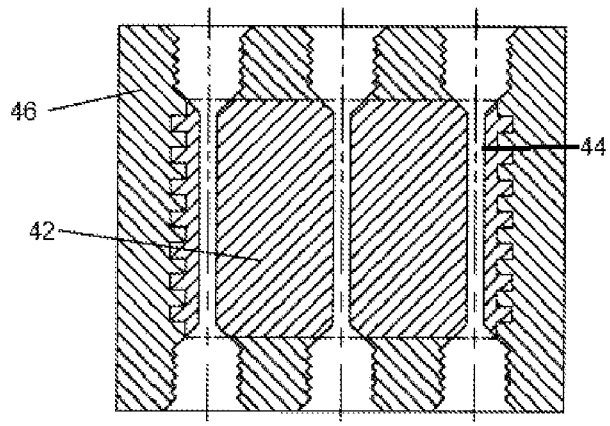
FIG. 24 shows a third step in a process of forming a vane having liquid metal cooling passages therein.

Referring now to FIGS. 22-24, a process of forming a vane having liquid metal cooling passages therein is shown. For example, FIGS. 22-24 show a process of forming the composite stator vane 15 with molybdenum 42 encapsulated by nickel-based alloy 46. The molybdenum piece 42 without the cooling passages may be secured within a mold and the nickel-based alloy 46 may be cast around it as shown in FIG. 22. When solidified, the liquid metal cooling passages 44 may be formed within the molybdenum piece 42 by a process such as electric discharge machining (EDM), as shown in FIG. 23. Then, the wider and threaded openings may be formed in the ends of the cooling passages 44 (as shown in FIG. 24) so that the external cooling tubes 52 can be threaded into the vane cooling passages 44. Seats may be formed on the ends of the molybdenum cooling passages 44 so that a tight seal will be formed to prevent oxygen from contacting the molybdenum material. As described above, platinum conical seals may be used to maintain a seal even when slight shifting or movement of the seats occurs that would otherwise form a small gap for oxygen to reach the molybdenum.

As also described above, molybdenum may be used for the liquid metal cooling passages 44 and a nickel-based alloy 46 may be used to cast over the molybdenum to encapsulate the molybdenum and to form the vane shape. However, other materials may be used instead of the nickel-based alloy without departing from the spirit or scope of the invention. Molybdenum may be used because of its high heat resistance. The molybdenum, however, may be oxidized by oxygen, and therefore must be encapsulated by another material that is not reactive to oxygen and is also resistant to high temperatures encountered in a turbine of a gas turbine engine. Alternatively, other refractory materials such as tungsten or columbium may be used instead of molybdenum.

Figure 25:
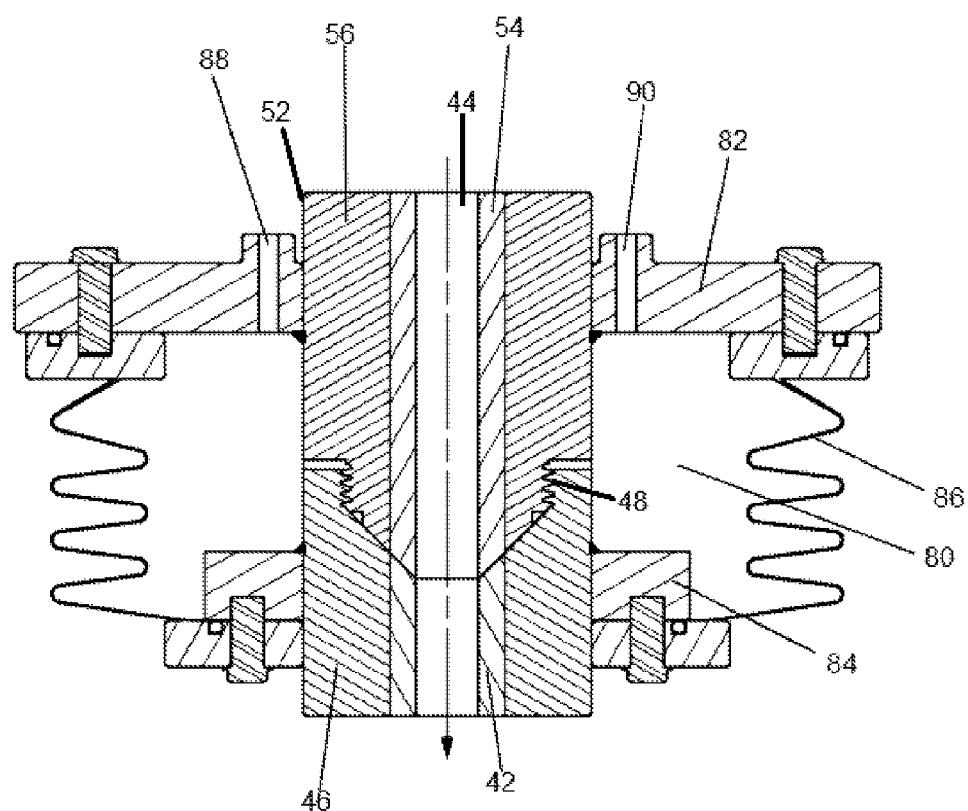
FIG. 25 shows a cross-sectional view of a gas-purged fluid connection that may be used in a closed-loop liquid metal cooling system.

Referring now to FIG. 25, a cross-sectional view of a gas-purged fluid connection that may be used in a closed-loop metal cooling system is shown. Specifically, FIG. 25 shows a connection between two molybdenum tubes 42 and 54 that may carry a liquid metal coolant, such as bismuth, in which a purge chamber 80 may be formed around the connection. For example, the connection may be between a molybdenum inner layer 42 of the cooling tube and the molybdenum inner layer 54 of an external tube 52. The purge chamber 80 may be filled with a gas such as argon (Ar) or nitrogen (N) to prevent oxygen from reacting with the molybdenum. Molybdenum (or, for example, tantalum or tungsten) inner layers 42, 54 of the tubes 40, 52 may be surrounded by outer oxidation-resistant portions 46, 56 made of, for example, stainless steel or nickel-based alloy to prevent oxygen from reacting with the molybdenum tubing. The cooling tube 40 and the external tube 52 may each have slanted or angled ends to form a tight fit. Threads 48 may be used on both ends of the tubes 40, 52 to connect the ends together. An upper flange 82 and a lower flange 84 may be secured to the nickel-based alloy portions 46, 56 and may enclose the purge chamber 80 along with a bellows seal assembly 86 and filled with a purge inert gas such as argon or nitrogen that does not react with the molybdenum. A source of pressurized purge gas may be connected to the purge chamber 80 through inert gas fill port 88. A pressure detection port 90 may also open to the outside to connect a pressure sensor that senses the pressure of the purge inert gas. The flexible bellows assembly 86 may be formed from, for example, stainless steel or a nickel-based alloy and may allow for the thermal expansion of the stainless steel or nickel-based alloy tube 46, 56 with respect to the molybdenum tube 42, 54 while maintaining adequate purge gas pressure within the chamber 80.

Figure 26:
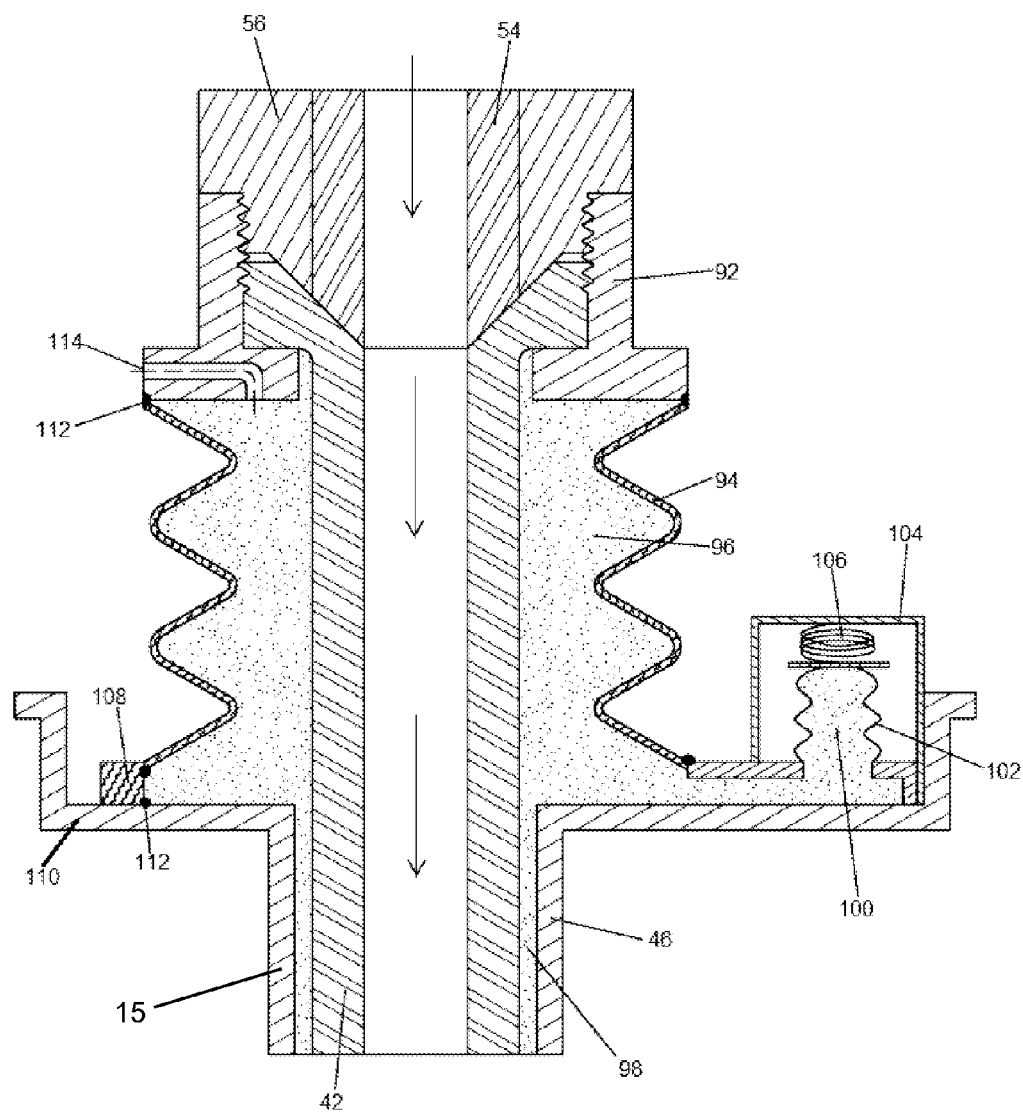
FIG. 26 shows a cross-sectional view of a stator vane and liquid metal cooling tube surrounded by a liquid sodium chamber.

Referring now to FIG. 26, a cross-sectional view of a stator vane and liquid metal cooling tube surrounded by a liquid sodium chamber is shown. The molybdenum inner portion 42 of the liquid metal cooling tube 40 and the molybdenum inner portion 54 of the external tube 52 may be encased by the oxidation-resistant portions 46, 56 (composed of, for example, stainless steel or nickel-based alloy) to protect the molybdenum from oxidation. For example, FIG. 16 shows a stator vane 15 with the coolant tubes 40 entering and exiting the vane 15. The ends of the liquid metal cooling tube 40 and the external tube 52 may be angled to form a tight fit when threaded together. A connector 92 and a bellows assembly 94 may form a bellows chamber 96 that holds a liquid metal such as sodium that is used to transfer heat from the hot vane wall 46 to the molybdenum tube 42. FIG. 26 shows a small gap 98 that may be filled with the liquid sodium formed between the vane wall 46 and the molybdenum tube 42. A second bellows chamber 100 may be formed by a second bellows assembly 102 enclosed by a housing 104 with a biasing spring 106 that forces the liquid sodium to fill the gap 98 so that no void is formed when the vane wall material 46 expands greater than the molybdenum tubes 42 when the vane 15 is exposed to a hot gas flow during engine operation. A retaining ring 108 may be welded to an endwall 110 of the vane 15 and to the bellows assembly 94 that secures one end of the bellows assembly 94 to the endwall 110. Another weld 112 may secure the top end of the bellows assembly 94 to the connector 92. A passage 114 may be formed in the connector 92 to fill the bellows chamber 96 with the liquid sodium. In this embodiment of the liquid metal cooling circuit for a stator vane in an industrial gas turbine engine with molybdenum tubes, the liquid metal may be bismuth.

In addition to uses in gas turbine engines, the liquid metal cooling circuit of the present invention may be used in other devices where a liquid metal has a corrosive effect on a base metal. For example, a nuclear power plant with a steam generator could also make use of a liquid metal cooling circuit. Further, a solar collector and power plant could also make use of a liquid metal cooling circuit to provide cooling or to extract heat for use elsewhere in the system.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

We claim:

1. A stator vane for a turbine engine used to produce electrical power, the stator vane comprising:
    an airfoil with an external surface exposed to a hot gas flow passing through a turbine;
    a liner forming a liquid metal coolant passage within the airfoil to provide cooling for the airfoil;

the airfoil formed from a base metal that is reactive to a liquid metal coolant;

a gap formed between the airfoil and the liner;

the gap filled with a heat conducting liquid to transfer heat from the airfoil to the liquid metal coolant through the liner; and, the liner being formed from a material that is non-reactive to both the base metal of the airfoil and the liquid metal coolant.

2. The stator vane of claim 1, and further comprising:

a first bellows chamber formed on an outer endwall of the stator vane to form a variable volume reservoir for the heat conducting liquid that fills the gap.

3. The stator vane of claim 2, and further comprising:

a second bellows chamber connected to the first bellows; and, the second bellows chamber being biased by a spring to keep the gap filled with heat conducting liquid during expansion and contraction of the gap.

4. The stator vane of claim 1, and further comprising: wherein the heat conducting liquid is liquid sodium.

5. The stator vane of claim 1, wherein the liquid metal coolant is bismuth or lead.

6. The stator vane of claim 1, wherein the liquid metal coolant is a combination of bismuth and lead.

7. The stator vane of claim 1, wherein the liquid metal coolant is a combination of bismuth, lead, and indium.

8. The stator vane of claim 1, wherein the base metal of the stator vane is one of a ferrous alloy, a nickel alloy, and a cobalt alloy.

9. The stator vane of claim 1, wherein the liner material is molybdenum or tantalum.

10. An industrial gas turbine engine for the production of electric power, comprising:

a compressor to supply compressed air to a combustor;

a turbine rotatably connected to the compressor, the turbine positioned to receive a hot gas stream produced in the combustor;

a first stage row of stator vanes within the turbine, the first stage row of stator vanes being formed from a base metal;

a cooling fluid passage formed within the first stage row of stator vanes;

a liquid metal coolant passing through the cooling fluid passage of the first stage row of stator vanes to provide cooling to the first stage row of stator vanes, the liquid metal coolant being reactive to the base metal of the first stage row of stator vanes; and, a liner within the cooling fluid passage of the first stage row of stator vanes to prevent the liquid metal coolant from reacting to the base metal of the first stage row of stator vanes, the liner being formed from a material that does not react with the base metal of the first stage row of stator vanes and the liquid metal coolant; and, the liquid metal coolant is a combination of bismuth, lead, and indium.

11. An industrial gas turbine engine for the production of electric power, comprising:

a compressor to supply compressed air to a combustor;

a turbine rotatably connected to the compressor, the turbine positioned to receive a hot gas stream produced in the combustor;

a first stage row of stator vanes within the turbine, the first stage row of stator vanes being formed from a base metal;

a cooling fluid passage formed within the first stage row of stator vanes;

a liquid metal coolant passing through the cooling fluid passage of the first stage row of stator vanes to provide cooling to the first stage row of stator vanes, the liquid metal coolant being reactive to the base metal of the first stage row of stator vanes; and, a liner within the cooling fluid passage of the first stage row of stator vanes to prevent the liquid metal coolant from reacting to the base metal of the first stage row of stator vanes, the liner being formed from a material that does not react with the base metal of the first stage row of stator vanes and the liquid metal coolant;

a gap formed between an airfoil of the stator vanes and the liner; and, the gap filled with a heat conducting fluid to transfer heat from the airfoil to the liquid metal coolant through the liner.

12. An industrial gas turbine engine for electrical power production, comprising:

a turbine with a stator vane, the turbine driving an electric generator to produce electrical power, the stator vane being formed from a base metal and with a coolant passage therein;

a liquid metal coolant circuit passing through the coolant passage formed within the stator vane, a liquid metal coolant being reactive to the base metal of the stator vane; and, a liner secured within the coolant passage of the stator vane to prevent the liquid metal coolant from reacting to the base metal of the stator vane, the liner being formed from a material that does not react with the base metal of the stator vane or the liquid metal coolant; and, the liquid metal coolant is a combination of bismuth, lead, and indium.

13. An industrial gas turbine engine for electrical power production, comprising:

a turbine with a stator vane, the turbine driving an electric generator to produce electrical power, the stator vane being formed from a base metal and with a coolant passage therein;

a liquid metal coolant circuit passing through the coolant passage formed within the stator vane, a liquid metal coolant being reactive to the base metal of the stator vane; and, a liner secured within the coolant passage of the stator vane to prevent the liquid metal coolant from reacting to the base metal of the stator vane, the liner being formed from a material that does not react with the base metal of the stator vane or the liquid metal coolant;

a gap formed between an airfoil of the stator vane and the liner; and, the gap filled with a heat conducting fluid to transfer heat from the airfoil to liquid metal coolant through the liner.

* * * * *